United States Patent Office

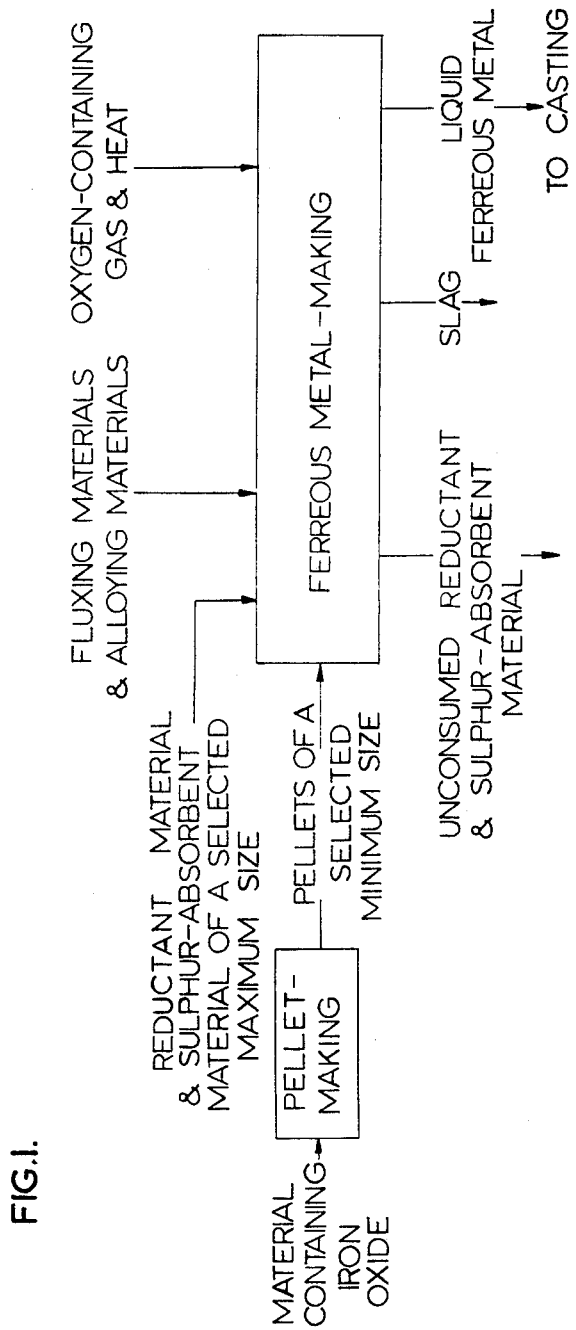

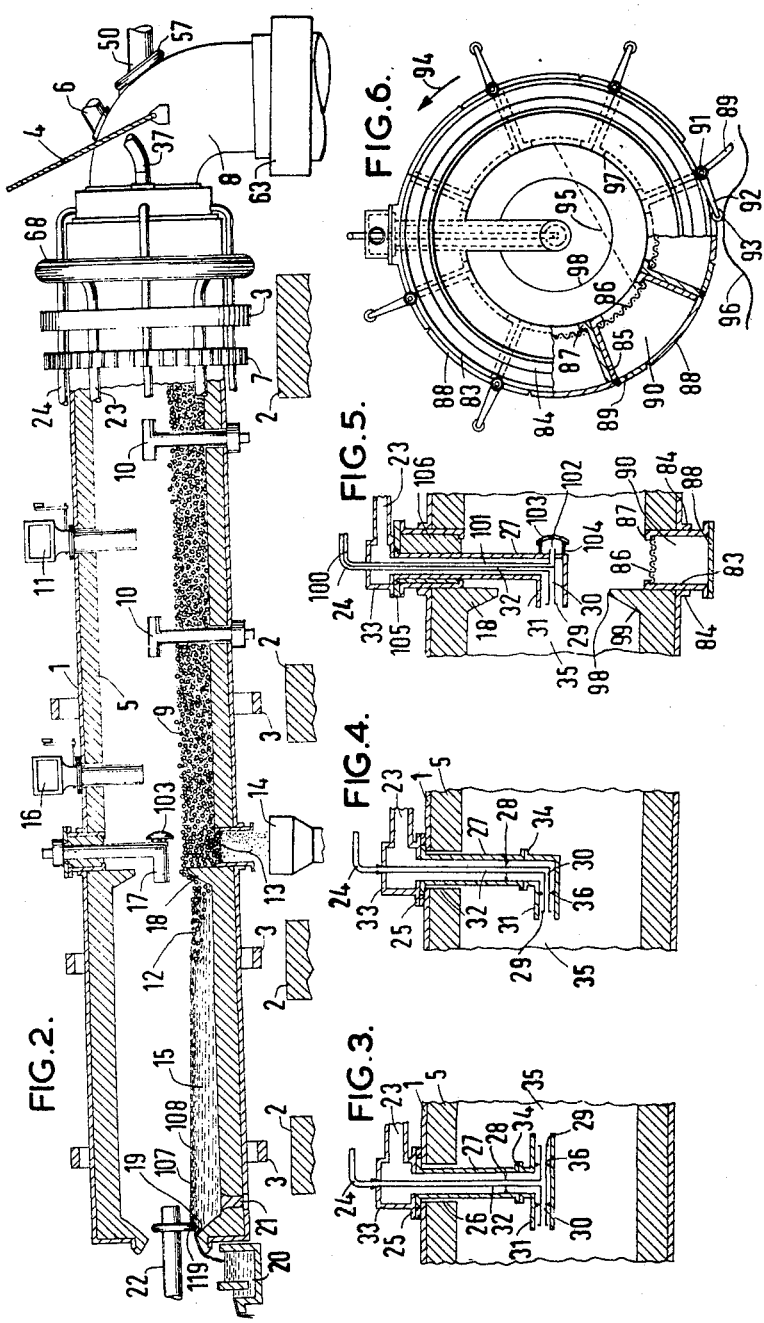

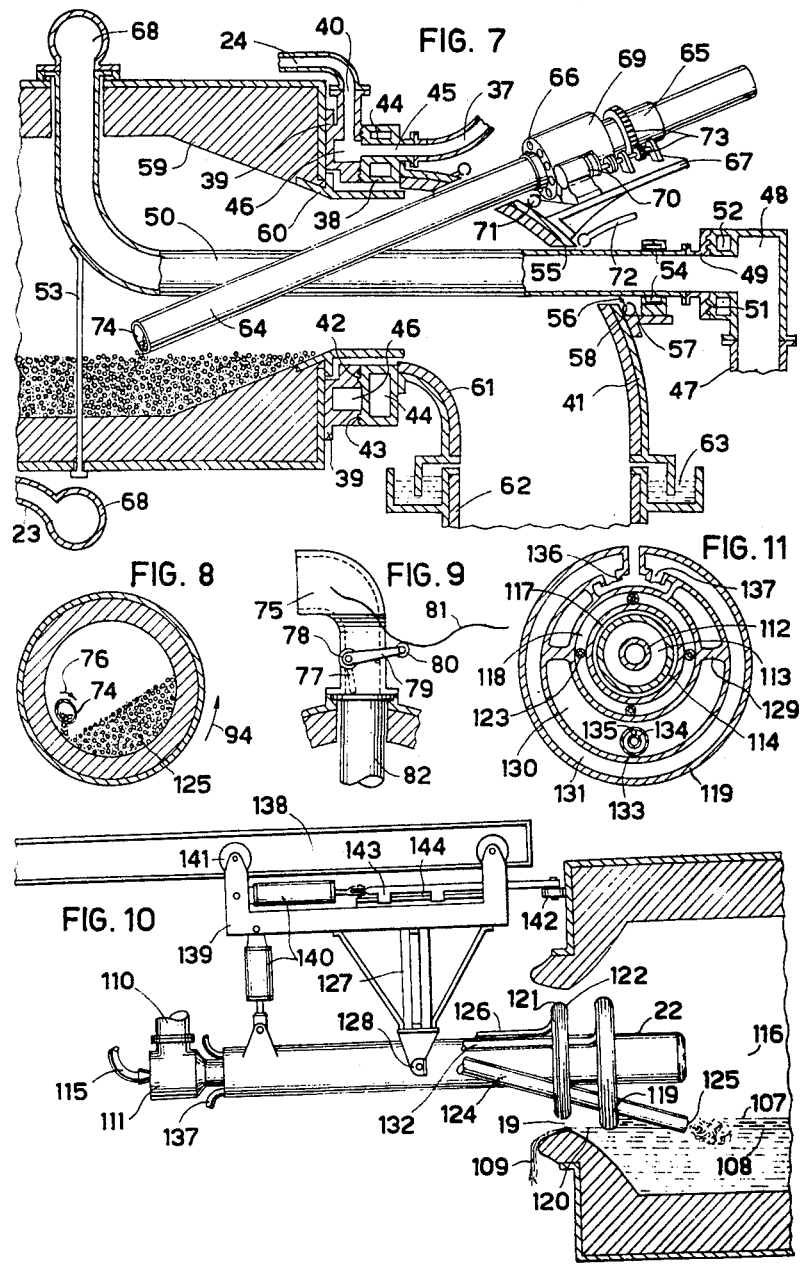

3,503,736
Patented Mar. 31, 1970

3,503,736
DIRECT IRON AND STEELMAKING PROCESS
William Lyon Sherwood, P.O. Box 2161,
Vancouver 3, British Columbia, Canada
Continuation-in-part of applications Ser. No. 262,078,
Mar. 1, 1963, and Ser. No. 330,895, Dec. 16, 1963.
This application Sept. 23, 1964, Ser. No. 398,625
Int. Cl. C21b *13/08, 13/14, 13/00*
U.S. Cl. 75—39                17 Claims

ABSTRACT OF THE DISCLOSURE

Liquid iron and steel are produced directly from pellets of iron ore concentrate by means of rotary furnace apparatus. The pellets are reduced to metallic iron by heating in admixture with solid reductant and sulphur-absorbent material in a gas-solid reaction zone, followed by a screening step for removal of excess reductant, ash and sulphur-absorbent material. Fluxes and alloys are added into the charge and advanced with retained reduced pellets and melted in a rotary gas-solid -liquid reaction zone by direct heating from a fuel burner to form liquid metal and slag which is advanced and refined in an independently heated rotary refining zone prior to discharge and casting into molds.

---

The invention is a process for the production of liquid ferrous metals such as, for example, steels and cast irons, directly from iron ore or ore concentrates. This application is a continuation-in-part of my co-pending applications Ser. No. 262,078 now abandoned, and 330,895, now abandoned.

Known processes for processing iron ore to obtain alloys of iron having a closely controlled composition generally involved two separate processing operations; firstly, a reduction process in which an iron containing undesirable impurities is obtained; and secondly, a refining process in which the undesired impurities are removed from the impure iron and alloying additions are made to obtain the desired product composition.

The product of the reduction operation is usually pig iron produced in liquid form by means of the blast furnace or an electric reduction furnace process, or sponge iron produced in solid form by means of a direct reduction process. Pig iron generally contains carbon, silicon, manganese, phosphorus and sulphur, and sponge iron generally contains residual iron oxide and gangue constituents, as impurities which require adjustment to the desired level in the subsequent refining process.

Known refining processes include the open hearth process, various converter processes, rotary furnace processes, and the direct-arc electric furnace process for production of steel, the cupola for production of cast iron and the electric induction, direct-arc and indirect-arc furnace processes for production of various alloys of iron. These processes are generally conducted in batches and, in addition to pig iron and sponge iron, employ scrap iron, steel and other iron alloys in the charge mixture.

It is a principal object of this invention to provide a new process for producing liquid ferrous metals directly from iron ore and ore concentrate, combining reduction, melting and refining stages into successive continuing operations.

It is another object of the process of this invention to provide elongated, continuous reaction zones along which various processing stages may occur simultaneously, and which extend without interruption from charging of iron oxide with reductant to discharging of liquid product, various processing stages thereby being adequately separated from each other by space whilst occurring simultaneously in time.

Another object is to provide a process in which sufficient and controlled agitation and mixing of charge materials is obtained thereby enabling efficient heat transfer, approach to equilibrium of chemical reactions and, in turn, closely controlled product composition.

Another object of the process of the present invention is to maintain near optimum process temperatures by independent heating for different processing stages, and in particular, by supplying concentrated heat where required, such as during melting.

Another object is to provide a process in which hot gas atmospheres within the reaction zones are controlled to prevent reoxidation of metallic iron to iron oxide, thereby minimizing refractory erosion by liquid iron oxide, increasing product yield and facilitating control of product composition.

Another object of the process of this invention is to provide for utilizing a wide variety of fuels and reductant, in the form of various grades of coal and coke, natural and manufactured gas, and fuel oils.

A further object of the process of this invention is to facilitate nearly complete combustion of furnace gases, thereby minimizing loss in the exhaust gas of heating values in unburned fuel, for example, unburned carbon monoxide.

Another object is to utilize the hot waste gases from advanced processing stages to make up part of the heat for preceding stages, that is, waste heat from refining is used for melting and reduction, and also waste heat from melting is used for reduction.

A further object is to provide for continuous or near continuous discharge of liquid metal at constant temperature and composition, which is particularly advantageous in combination with a subsequent continuous casting operation.

A still further object is to obtain high yields by recirculating nearly all valuable by-product materials into the charge and discarding mainly materials of little value.

Further objects of the new process of this invention which relate to the economics of ferrous metal production are to provide lower fuel requirements, higher metal yields, fewer operating personnel, and simpler process equipment at lower cost, than by using known processes.

The process of the present invention comprises a solid-state reduction, in a gas-solid reaction zone, of pellets containing iron oxide in a heated admixture of excess solid reductant, followed by removal of the excess reductant after completion of reduction to the desired extent, whilst retaining the pellets in process at elevated temperature under a controlled amtosphere; melting of the retained pellets in a gas-solid-liquid reaction zone forming two liquid phases of metal and slag; and refining of the metal in a gas-liquid reaction zone prior to discharge and casting. The key step of removing the excess reductant facilitated by selecting the dimensions of charge materials so that (a) the pellets are not smaller than a selected minimum size, usually about 5 millimetres, and (b) the reductant material is not larger than a maximum size selected to ensure its near complete removal, by size separation from the pellets, from the gas-solid reaction zone at an intermediate processing stage. In addition to reductant, the introduction of sulphur-absorbent material to prevent sulphur contamination of the pellets is usually required into the gas-solid reaction zone, this material also being of a selected maximum size to effect its removal along with the excess reductant material. The process provides means for close control of product composition over a wide range, and this control is largely obtained by (a)

effecting a consistently high degree of metallization of the pellets in the gas-solid reaction zone, and (b) introducing controlled quantities of fluxing and alloying materials into the process, which are melted along with the pellets and thereby take part in and control the slag-metal refining reactions in the gas-liquid reaction zone.

The zones of the process are preferably of elongated form, and the charge materials are continually and successively advanced along the zones whilst being subjected to continual agitation and mixing action.

The desired process temperatures are obtained by introducing heat at spaced intervals along the process, directly into each of the gas-solid, gas-solid-liquid, and gas-liquid reaction zones, thereby heating each zone independently. Hot products of combustion flow countercurrent to the general movement of charge materials and are expelled from the gas-solid reaction zone.

Another aspect of the invention consists of a preferred rotary reactor suitable for conducting the process of this invention. In general terms, this apparatus comprises a single, elongated rotary kiln-type reactor unit containing a gas-solid reaction zone, a gas-solid-liquid reaction zone and a gas-liquid reaction zone extending in this sequence from the charge end to the discharge end; feeding equipment for introducing solid charge materials into the gas-solid reaction zone; at least one and preferably a plurality of burners adapted for introducing heat and oxygen-containing gas at spaced intervals along the gas-solid reaction zone; a screening device forming a portion of the reactor wall for removing fine-sized materials from the gas-solid reaction zone just prior to passing the retained coarse-sized materials into the gas-solid-liquid reaction zone; a burner for introducing heat directly into the gas-solid-liquid reaction zone for melting; a burner at the reactor discharge end for introducing heat for refining directly into the gas-liquid reaction zone; and a discharge opening for discharging liquid ferrous metal and slag from the reactor.

Preferred additional features include charging equipment for solid materials at intervals along the gas-solid reaction zone and at the reactor discharge end; sealing devices for the screen and fine-sized material discharge, and also the charge and discharge and openings; an annular dam adapted for dividing and confining partly liquid charge materials in the gas-solid-liquid reaction zone; and a special mounting assembly for movably positioning the discharge end burner, and an attached slag dam, in the reactor discharge end opening.

As will become apparent from the description to follow, a wide range of ferrous alloys may be produced by the process and the apparatus of this invention, including various grades of steels, cast irons and special alloys of iron.

Various other objects, features, advantages and methods of operation of the new process and the apparatus will become apparent from the following detailed description and claims, and by referring to the accompanying diagrammatic drawings, in which:

FIGURE 1 is a general flow sheet illustrating the process;

FIGURE 2 is a schematic side view, partly in section, of an embodiment of a rotary, kiln-type reactor suitable for carrying out the process of the invention;

FIGURE 3 is a detailed section, on an enlarged scale, of a suitable burner arrangement for introducing heat and an oxygen-containing gas into the reactor;

FIGURE 4 is a detailed section, on an enlarged scale, of an alternative burner arrangement to the one shown in FIGURE 3;

FIGURE 5 is a detailed section, on an enlarged scale, of a device for removing fine-sized materials from the gas-solid reaction zone, and a suitable burner arrangement for the control of temperature and gas composition in proximity to the junction between the gas-solid and gas-solid-liquid reaction zones of the process;

FIGURE 6 is a transverse view, partly in section, and on an enlarged scale of the device of FIGURE 5;

FIGURE 7 is a side elevation, partly in section and on an enlarged scale, of the feed end of the reactor, showing a suitable arrangement for supplying fuel and oxygen-containing gas to the reactor, and also showing a preferred feeding device for solid materials into the charge end of the reactor;

FIGURE 8 is transverse sectional view of the reactor at the location of discharging the feeding device shown in FIGURE 7, and showing the preferred position of the discharge end of the feed pipe in relation to the inner wall of the reactor;

FIGURE 9 is a fragmentary, transverse sectional view, on an enlarged scale, of part of the reactor showing, in elevation, a suitable feeding device for solid charge materials at intermediate locations along the gas-solid reacton zone;

FIGURE 10 is a side elevation, partly in section, of a discharge end of the reactor showing a burner, atmosphere seal, slag dam, and discharging device arrangement; and FIGURE 11 is a transverse sectional view, on an enlarged scale, of the burner shown in FIGURE 10 at the location of the slag dam.

Referring to FIGURE 1, it may be seen that the preparation of feed pellets of a selected minimum size is an essential feature of the process. The preparation of material containing iron oxide generally involves crushing and grinding of iron ore, followed by concentrating using know processes, in order to increase the iron oxide content and decrease the gangue and other undesirable impurities. The concentrate is then reagglomerated to obtain pellets of the required size range. With some high grade ores, the concentrating step may be omitted, or screened raw ore may be used directly as a feed for the process, in which case reference to screened pieces of ore would be considered to be synonymous with reference to pellets containing iron oxide. Another possible source of pellets as feed for the process is a tailings product of a recovery process for some other metal or mineral, concentrated and agglomerated to obtain pellets of the required size range.

In order to avoid excessive slag volumes in the gas-liquid reaction zone and to reduce any tendency of the pellets to soften and become sticky in the gas-solid reaction zone, it is generally desirable to have an iron content of at least 65 percent, by weight, in the ore or concentrate before agglomerating. By finely grinding the ore, more complete liberation of the finely divided iron oxide from gangue, and thus a higher iron content of the concentrate, can be obtained. Since a fine grind also makes the concentrate easier to agglomerate into pellets and increases the pellet strength, the ore or concentrate is usually ground to a size, for example, of at least 75 percent of particles having minimum dimensions less than 0.04 millimetre.

Fluxing materials for control of slag composition in the gas-liquid reaction zone of the process can be, but are not necessarily added to the concentrate or fine ore before pelletizing. Additions in finely divided form, made at this stage, also can function as a binder for the pellets, increasing their strength and reducing any tendency to break down to a fine size during passage through the gas-solid reaction zone. Types of fluxing materials would include, for example, limestone, dolomite, burnt lime, hydrated lime and bentonite. Controlled quantities of allowing materials to comprise the alloy constituents of the liquid ferrous metal may also be introduced as constituents of the pellets. Examples are such elements as manganese, silicon, chromium, molybdenum and nickel, added as alloy mixtures, metals, ores or concentrates in finely divided form.

In the pellet-making step, which may be carried out on conventional equipment, such as rotating pelletizing drums or discs, the moisture content should be very closely controlled to obtain pellets which are as uniform in size and physical characteristics as possible. The moist pellets can be charged directly into the process, dried before charging, or roasted in an oxidizing atmosphere to remove sulphur or other impurities, or to increase their strength and improve their storage and handling characteristics. A heat saving, in some cases, can be effected by charging roasted pellets directly into the process without cooling.

Pellets, reductant material and sulphur-absorbent material are introduced into the charge mixture in the gas-solid reaction zone, generally together at the feed end of the process, although varying proportions of the reductant material and sulphur-absorbent material may be introduced at a later stage, at intermediate locations along the gas-solid reaction zone. All, or nearly all, of the reductant material and sulphur-absorbent material which is not consumed in carrying out the gas-solid reactions, is removed from the gas-solid reaction zone prior to entry of the charge mixture into the gas-solid-liquid reaction zone. The reductant material and sulphur-absorbent material is to be distinguished from materials introduced into the process mainly with the purpose of forming a liquid metal and slag of the desired composition in the gas-liquid reaction zone. All solid materials added primarily to form slag constituents and to control the chemical reactions, fluidity and composition of the liquid slag will be referred to as fluxing materials, rather than sulphur-absorbent material, and all solid materials added primarily to alloy with the liquid metal or to deoxidize the metal will be referred to as alloying materials. Thus, materials containing carbon and added with the main purpose of deoxidizing or increasing the carbon content of the liquid metal comprise part of the alloying materials rather than part of the reductant material. Also, it is to be understood that alloying materials and fluxing materials added to the material containing iron oxide as a constituent of the pellets are to be considered as part of the alloying and fluxing materials introduced into, and included in, the charge mixture.

The reductant material, which is added mainly as solid fuel for heating and to reduce iron oxide contained in the pellets to metallic iron, is generally coal, coal char or coke. When it is introduced at the feed end of the process, the reductant material preferably should have a low content of volatile matter, as well as be non-caking and have a high ash-softening temperature. The sulphur-absorbent material which is added to prevent sulphur contamination of the pellets during their passage through the gas-solid reaction zone of the process, is generally limestone, $CaCO_3$, or dolomite, $CaMg(CO_3)_2$. Since it has greater resistance to disintegration, dolomite is usually preferred to limestone.

The proper selection and control of the size distribution of the charge materials is an essential feature of the process. The pellets should preferably be within the range of about 5 to 15 millimetres in size. Wider size ranges are allowable, but would generally be confined within the range of about 3 to 25 millimetres. These size ranges are preferred in order to combine the desirable characteristics of good strength, short reaction time, resistance to sticking and agglomeration at elevated temperature, low pick-up of gangue and other impurities on the pellet surface, and resistance to breaking and disintegration during passage along the gas-solid reaction zone. Since a size separation is made from the pellets at an intermediate state of the process, it is also desirable that a substantially constant and major proportion of the pellets not be smaller than a selected minimum size. For example, the pellet size range might be selected and controlled so that 96 percent plus or minus 2 percent of the pellets are caught on a screen having 5 millimetre openings, which size could then be referred to as the selected minimum size of the pellets. When pelletizing is followed by screening, the size of screen openings affords a very close control of the minimum pellet size.

The selected minimum pellet size provides a basis for an upper limit of maximum size for the solid pieces of reductant and sulphur-absorbent material. Where no significant change in relative dimensions between the pellets and pieces of reductant and sulphur-absorbent material occurs within the gas-solid reaction zone, the selected maximum size of the pieces of reductant and sulphur-absorbent material would not be greater than the selected minimum pellet size. Changes in relative size, however, can occur in the gas-solid reaction zone. For example, pellets, on the average, might increase in size by 20 percent, and the reductant material decrease in size by 20 percent, in which event reductant material considerably larger than the minimum pellet size could be completely removed from the gas-solid reaction zone by a size separation. The selection of sizes of the charge materials, therefore, also depends to some extent upon their tendency to increase or decrease in size during processing.

Very fine reductant and sulphur-absorbent material is generally subject to high dust losses; therefore, particles finer than about 0.5 millimetre are usually avoided. Consideration of cost and surface area further influences the selection of sizes of the materials within the above range.

The amount of reductant material charged should be enough to provide an excess of solid carbon after passage through the gas-solid reaction zone sufficient to ensure a high and consistent metallization of the pellets. The amount of this excess varies according to the characteristics of the pellets and reductant, and may be established by trial and error. The amount of sulphur-absorbent material required can vary from zero to 10 percent of the weight of pellets, the quantity employed depending upon the amount of sulphur contained in the reductant material and pellets, and also upon the maximum sulphur permissible in the liquid metal product.

In the gas-solid reaction zone of the process, moisture is vaporized and volatiles are evolved from the reductant material as the charge increases in temperature by means of heat transferred from the hot gases. Upon further heating, the iron oxide in the pellets is reduced from $Fe_2O_3$, to $Fe_3O_4$, FeO and metallic Fe, in sequence, substantially by reaction with carbon monoxide, hydrogen and other reducing gases as generated mainly within the gas-solid reaction zone. Carbon dioxide gas, $CO_2$, is generally liberated from the sulphur-absorbent material, leaving solid calcium and magnesium oxides, CaO and MgO, which then may react and combine with sulphur released by gasification of the solid reductant material. In order to complete the gas-solid reactions to the desired metallic iron content of the pellets, the charge is heated to a temperature within the range of 1500° F. to 2300° F., and preferably between 1800° F. and 2200° F. The said temperature is usually maintained nearly constant for a period longer than 10 minutes, and up to several hours, the time and temperature employed being selected mainly according to the reactivity of the reductant material, the physical and chemical constitution of the pellets and their desired metallic iron content.

The charge mixture is continually advanced along an elongated gas-solid reaction zone in a manner to provide continual relative movement between the pellets and pieces of reductant material, in this way reducing any tendency of the pieces of material comprising the charge mixture to stick together and agglomerate. A substantial portion of the heat required for heating and maintaining the charge mixture at reaction temperature is supplied by introducing an oxygen-containing gas, usually air, at spaced intervals along the gas-solid reaction zone. The air creates heat by reacting with the reductant material in the charge mixture and also with combustible gas generated from the bed of charge mixture, the said combustible gas and the products of combustion flowing in general countercurrent to the flow of charge material. Additional heat may be provided by preheating the air so introduced by means of heat transferred from the exit gas after it leaves the feed end of the process, by means of a heat exchanger. Hot gas emitted from the gas-solid-liquid reaction zone and flowing countercurrent to the material flow, also provides a heat source for the gas-solid reaction zone. Any additional heat required may be supplied from an external source at spaced intervals along the gas-solid reaction zone, for example, by supplying at intervals a gaseous or liquid fuel with sufficient oxygen-containing gas for combustion of the fuel.

Coal char, or low-temperature coke containing a high proportion of volatile matter which, in many locations, is lower in cost or more readily available than low-volatile materials, can be utilized most effectively by its introduction into the charge mixture at an intermediate location, or locations along the gas-solid reaction zone. The volatile matter is evolved as a gas upon heating and is combusted with oxygen-containing gas as it flows towards the feed end of the process, the heat thus generated being utilized for heating and to maintain reaction temperature. Another advantage which can be gained in this manner is that a relatively small quantity of a highly-reactive material accelerates the iron-forming reactions, reducing the time required at elevated temperature and increasing the maximum production rate obtainable with a given process equipment. Should the sulphur content of the pellets or reductant material be high, it may also be advantageous to add additional sulphur-absorbent material along with the late-charged reductant material, these materials all being substantially within the size range as previously defined for reductant material and sulphur-absorbent material.

As well as reductant material and sulphur-absorbent material, alloying materials and fluxing materials are generally introduced into the charge mixture along the gas-solid reaction zone, with the purpose of controlling the slag and metal chemistry in the subsequent gas-liquid reaction zone of the process. Examples are lump ferromanganese, ferrosilicon, ferrochromium, metallic nickel, limestone, dolomite and carbon in the form of a carbon alloy, lump baked carbon or graphite. It will be understood that any such additions which are made before removing the fine-sized materials should be at least the minimum size of the coarse-sized materials to avoid being discared. These additions could also be made following removal of the fine-sized materials at a later stage of the process, in which event the minimum size of the pieces of added material would be of lesser importance. As a suitable process apparatus is described, it will become apparent, however, that the addition of large quantities of materials to the process after the removal of the fines would be difficult to implement in practice.

When the iron oxide contained in the pellets has been reacted, in a substantial proportion, to metallic state, the fine-sized materials are removed from the gas-solid reaction zone. The materials removed include most, if not all of the unconsumed reductant material and sulphur-absorbent material, along with any fine-sized pellet fragments obtained by disintegration of the pellets. After removal, these fine materials are generally cooled under a non-oxidizing atmosphere or quenched in water, coal char and pellet fragments being recovered by wet screening and magnetic separation methods. The coal char is usually recirculated into the gas-solid reaction zone, preferably after screening out the very fine particles, and comprises a substantial proportion of the reductant material in the charge mixture. The pellet fragments can be reground and added to the ore or concentrate before pelletizing, and hence recharged into the process as part of the pellets; or alternatively, in their existing form or after briquetting, be used as a feed for other steel or iron-making furnaces; or be used in other metallurgical operations, for example, copper cementation. Sulphur-absorbent material particles, usually consisting of very fine hydrated lime or dolomite, are generally discarded since they contain considerable sulphur and are of small value.

The coarse-sized materials, including pellets, alloying materials and fluxing materials added up to the stage of the removal of fine-sized materials, are retained for further processing, which involves heating and advancing them into a gas-solid-liquid reaction zone containing a partially melted charge mixture in contact with hot gases, and in which the charge mixture is heated until melting is completed, whereby two liquid phases in close contact, a top layer of slag and a bottom layer of liquid ferrous metal, are formed and are introduced into a gas-liquid reaction zone. The heat required for melting is supplied, preferably, in part by hot gases emitted from the gas-liquid reaction zone and flowing countercurrent to the movement of partly-melted material, and in part by combustion between fuel and oxygen-containing gas introduced directly into the gas-solid-liquid reaction zone. It might also be possible to introduce heat from sources at spaced intervals along the gas-solid-liquid reaction zone but, as will become apparent upon description of suitable process apparatus, the high temperature of the liquid metal makes such an arrangement difficult to implement in practice. Additions of alloying and fluxing materials could also be made directly into the gas-solid-liquid reaction zone, but they may also be more easily made into the gas-solid reaction zone.

It should be understood that the term gas-liquid reaction zone implies the occurrence of liquid-liquid and gas-gas reactions, as well as gas-liquid reactions within the said zone. Similarly, reactions involving only solids, and only gases, occur in the gas-solid reaction zone. The term gas-solid, then implies only that the physical state of the principal phases present, of the materials in process, are solid or gaseous, and the term gas-liquid, that they are liquid or gaseous. In the transition where melting occurs, there are gases, liquids and solids present simultaneously.

The primary control of the gas-liquid reactions and composition of the product metal is obtained by control of the quantity and composition of the retained materials which, when melted, comprise the constituents of the liquid metal and slag. Although some further reduction of iron oxide to metallic iron after the removal of reductant material could be effected, in the solid state, by means of a reducing atmosphere, and in the liquid state, by means of a reducing slag, close control of finished metal composition is facilitated by a high degree of metallization of the iron contained in the pellets. The percent of iron in metallic state should be as constant as possible and preferably should be greater than 95 percent. The quantity and type of fluxing materials present control the slag basicity and fluidity; the quantity and type of alloying materials determine the alloy content of the metal and the degree of slag and metal oxidation. A final adjustment and control of metal composition can be effected by introducing additional alloying and fluxing materials directly into the liquid slag and metal, usually in finely-divided form, and near the discharge end of the gas-liquid reaction zone, or after discharge.

In the preferred embodiment of the process, the gas-solid-liquid and gas-liquid reaction zones are of considerable length relative to their cross-sectional area. The retained charge materials, while continually advancing along the length of these zones, are also subjected to continual agitation. By agitating action, the rates of heat transfer and chemical reactions are increased; segregation and non-uniform movement of charge material along the zones are avoided. By maintaining continual flow of material along the zones, various stages of the operation are conducted simultaneously, avoiding periods of accumulation or storage in which storage vessels and transfer equipment are employed for short periods, at capacities considerably in excess of the average process output.

A large proportion of the heat required in the gas-liquid reaction zone is preferably supplied from a heat source having a high-temperature potential, and located near the discharge location of metal and slag. The high temperature can be obtained by employing fuel for combustion along with preheated air or oxygen-enriched air, or an electrical means of increasing flame temperature, the products of combustion flowing countercurrent to the flow of liquid metal and slag, through the gas-liquid reaction zone into the gas-solid-liquid reaction zone. Additional heat could be supplied at intervals along the gas-liquid reaction zone, but it will be apparent that any such heating is difficult to implement simultaneously with mixing and agitating action.

The liquid metal and slag are generally heated within the temperature range of 2300° F. to 3100° F. before discharge, the temperature depending upon the type of metal required and its subsequent use. It is preferable that metal be discharged continually. The slag flow can be regulated by means of an adjustable barrier obstructing the slag discharge opening, enabling a control to be maintained of the thickness of the liquid slag layer in contact with the metal within the gas-liquid reaction zone. The liquid metal and slag may be discharged together and separated after discharge; or the metal may be withdrawn separately by siphon, or tapped separately from the gas-liquid reaction zone at regular intervals. The metal may be cast directly after slag separation; alternatively, it may be tapped into a holding furnace or ladle and subsequently be poured into moulds, or be continuously cast.

FIGURE 2 illustrates a rotary kiln-type reactor suitable for implementing the process which has been described. The body of the reactor consists of a cylindrical steel shell 1 which, with the exception of a relatively small area at the location of the screen section 13, is lined with refractory material 5. The refractory may consist of multiple layers, for example, an inner layer of a strong material having good resistance to heat, wear and chemical attack and an outer layer, next to the reactor shell, consisting of an insulating material to prevent the passage of heat from inside the reactor to the outer shell and hence to the surrounding air.

The entire unit is supported by means of rollers 3, resting on conventional kiln trunnions mounted on the foundation supports 2, and is adapted to be rotated at a predetermined number of revolutions per minute, such as by a motor and train of speed reducing gears, the last one of which is meshed with bull gear 7 secured around the reactor shell. The reactor is usually inclined at a small angle to the horizontal, to cause the charge material to flow by gravity from the feed end towards the discharge end as the reactor is rotated.

Only solid charge materials 9 are contained in the gas-solid reaction zone which extends from the charge end feed apparatus 6, to a location on the discharge side of the dam 18, where there is a transition to the gas-solid-liquid reaction zone, which contains both solid and liquid charge materials 12. Only liquid charge materials 15 are contained in the gas-liquid reaction zone, which extends to the discharge opening 19. The slag and metal may be separated after discharge by slag separation device 20. Substantially, only the coarse-sized materials are retained within the gas-solid reaction zone and advance to the gas-solid-liquid reaction zone, the fine-sized materials being discharged through the screening apparatus 13 into a receptacle 14.

Charging equipment 11 for reductant and sulphurabsorbent material, and charging equipment 16 for alloying materials and fluxing materials are provided for introducing solid materials into the charge mixture at intermediate locations along the gas-solid reaction zone. Fuel and oxygen-containing gas to maintain the required temperatures and control the gas composition within the zones are supplied into the gas-liquid reaction zone by the discharge end burner 22, directed into the gas-solid-liquid reaction zone by the burner 17, and supplied at intervals along the gas-solid reaction zone by the burners 10. Exit gases are withdrawn through the kiln head assembly 8, which is supported by cable 4, into a suitable gas-discharge duct under controlled suction by conventional means, for example, an induced draft fan and flow control louvers, not illustrated. One or more tap-holes 21 for emptying metal and slag from the gas-liquid reaction zone is also provided.

Although various reactor lengths and diameters may be used, lengths of 200 to 400 feet and shell diameters of 10 to 16 feet are given by example only as being suitable for commercial installation, it being understood that these dimensions are not limitations. Also, the diameter can vary along the reactor length, for example, the diameter along the gas-liquid reaction zone could be smaller than the gas-solid reaction zone diameter, thus decreasing the quantity of metal contained therein and also decreasing the time of residence of the liquid metal within the reactor. The reactor may comprise an integral body or may be formed by coupling two or more separate sections together to form the reactor.

The inner lining along the gas-liquid reaction zone is comprised of refractory known to be resistant to liquid metal and slag, according to known ironmaking and steelmaking practice. Upstanding baffles or lifters anchored within the gas-solid reaction zone according to known rotary-kiln and rotary dryer practice can be employed to increase the rate of heat transfer between the gases and solid charge material within the reactor. Such baffles may also serve to maintain a thorough mixing between the various pieces of material comprising the charge mixture, or to assist in advancing the solid charge mixture along the gas-solid reaction zone.

The most satisfactory angle of incline of the reactor axis is probably between 1° and 2° to the horizontal, although a level reactor could be operable, employing baffles to effect charge movement along the gas-solid reaction zone. The speed of rotation is generally within the range of 0.25 to 2 revolutions per minute and preferably about 1 revolution per minute, it being understood that these speeds are not limitations.

The charge mixture is fed into the reactor by means of the raw material feeder 6, and is advanced continually by gravity and the rotary movement of the reactor through the gas-solid reaction zone where it is heated and reacted in the solid state. The rotary movement of the reactor walls also provides continual mixing and movement between pieces of material within the bed of charge mixture, thus minimizing any tendency of the pieces to stick together and agglomerate and also promoting uniformity of heat transfer and chemical reactions between gases and charge mixture. Controlled quantities of an oxygen-containing gas, generally preheated air, and fluid fuel when required, are introduced into the reactor at intervals along the gas-solid reaction zone by means of the burners 10.

FIGURE 3 shows a suitable type of shell-mounted burner for introducing fuel and oxygen-containing gas into the reactor. Air is supplied through air pipes 23, and gaseous fuel through fuel pipes 24, having individual flow control valves for each burner, and which are fastened to the shell of the reactor and rotate with it. The outer burner pipe 27, consisting of heat-resistant alloy material, projects through an opening 26 in the metal and refractory shell of the reactor. The outer burner chambers 33 is fastened to the reactor shell at its flanged end 25 by means of bolts or screws, which also act to hold the outer burner pipe 27 firmly in position. To enable the burner pipe to be easily removed for replacement or repair, the air nozzle section 31 is preferably attached to the outer burner pipe 27 at flanges 34 with bolts or screws. The inner pipe 32 and gas nozzle pipe 30, are centered inside the outer burner pipe 27 and the air nozzle section 31, by means of pipe centering ring 28, and nozzle centering rings 36.

In order to prevent clogging with charge material, to ensure uniform flame distribution around the periphery of the reactor and to avoid any direct flame impingement on the reactor walls, the burner nozzles are preferably located to be nearly coincident with the axis of the reactor and are directed along this axis. The burner shown in FIGURE 3 fires simultaneously in opposite directions, countercurrently and cocurrently, to the general flow of gases within the reactor. Some advantages of two-directional firing are a lower flame velocity which reduces the likelihood of direct flame impingement on the reactor walls, and increased turbulence of gases inside the reactor, with resulting increased rate of gas-solid reactions.

An alternative type of burner with a uni-directional nozzle is illustrated in FIGURE 4, which is similar in all other respects to the burner shown in FIGURE 3 and can be pointed in either axial direction. The burner arrangements would be similar when using liquid fuel, except that a fuel-atomizing nozzle would be employed, according to known oil burner practice. Adequate liquid fuel pressure would be maintained by a booster pump mounted on, and rotating with, the reactor shell. In an alternative arrangement, the liquid fuel is stored in tanks mounted on the shell, and pumped directly to the burners. For air atomization, a shell mounted air compressor may be used. The electricity for the pump is supplied in known manner by means of stationary brushes in contact with rotating collector rings attached to the reactor shell.

Close temperature control is an important feature of the reactor. Temperatures are measured by means of thermo-couples which project through openings into the reactor, and which are connected to temperature recorders through rotating collector rings in contact with stationary brushes. As this part of the structure is well known it has not been illustrated. The individual burner fuel and air flow control valves, not illustrated, are regulated according to the temperature readings obtained.

Referring to FIGURE 7, which shows a suitable feed-end arrangement of the reactor, fluid fuel, for example, natural gas, is supplied from an external source through flexible stationary duct 37, into and through an annular distributor head concentric with the axis of the reactor, by way of duct or ducts 45, through stationary section 38, which is attached to stationary reactor head 41, and into annular distributor duct 46 concentric with the reactor axis and located within rotating section 39, from where it passes through rotating connections 40 into the burner supply fuel pipes 24 which are also rotating with the reactor. A seal, between the stationary and rotating faces, which prevents leakage of fluid fuel from the distributor, is effected by two concentric sealing surfaces, an inner sealing surface 42 and an outer sealing surface 43, which are grooved and continuously supplied with sealing grease. A uniform pressure between the sealing surfaces can be maintainend by means of cables 4 attached to the reactor head 41 and to counterweights by way of a system of pulleys, not illustrated. These greased sealing faces are maintained cool by a water jacket 44 located within the stationary head section.

The oxygen-containing gas, for example air, is preferably preheated by passing through a heat exchanger, up to 75 percent of the heat contained in the reactor exit gases being transferred to the incoming air in this manner. The preheated air is supplied through flexible stationary duct 47, into stationary section 48, into and through rotating section 49, which is connected to rotating axial pipe 50 which continues through, but is not in contact with an opening 55 in the reactor head, and which leads to rotating air distributor manifold 68 mounted on the exterior of, and rotating with, the reactor shell, and hence into rotating air pipes 23. A seal between the stationary and rotating section can be effected by grooved, lubricated surfaces 51, which are cooled by water jacket 52, or known equivalent sealing means. To maintain the required uniform contact pressure between these sealing surfaces, the stationary section 48 can be suspended by a system of cables and counterweights in a similar manner employed for the reactor head, or mounted on rollers which run on tracks parallel to the reactor axis, the necessary seal face pressures being supplied by pulleys and counterweights, or springs. The axial pipe 50 is held in its central position within the reactor by means of support rod 53, and externally of the reactor head by the adjustably positioned rollers 54. In order to prevent leakage of gas or air through opening 55 in the reactor head, a sealing curtain 56 of high velocity air or other gas can be provided. This gas curtain is emitted from an annular header pipe 57 which is supplied with air or other gas under pressure, through the pressurized gas supply pipe 72. The annular header pipe 57 encircles the rotating axial pipe 50, and is provided with a continuous slit opening 58 of adjustable width, or alternatively, a plurality of closely spaced nozzles, directed inwards to impinge on the outer surface of axial pipe 50. Since the exit gas within the reactor head is at a substantial velocity in a direction to cause flow out through opening 55, any leakage would be expected to be outwards. The high-velocity sealing gas, therefore, as well as being directed inwards towards the reactor axis is shown directed at an acute angle to the reactor axis towards the discharge end of the reactor. In addition to the preheated air supplied using the above described apparatus, it may be desirable, under some conditions, to supply air by means of fans mounted on, and rotating with the reactor shell.

A smooth flow of exit gas from the reactor can be maintained by means of tapered refractory section 59 and retaining ring 60, which is fastened to the end of the reactor shell. In order to prevent excessive heat loss from the reactor head, it is preferably lined with an insulating refractory material 61. When preheated air is employed, the air distribution manifold 68 and air pipes 23 along the reactor shell would also be insulated. A sealed connection between the freely suspended reactor head 41 and fixed exhaust gas duct 62 is effected by means of a water seal 63.

When the pellets are fed into the reactor in the moist or dried condition after pelletizing, without an intermediate hardening by roasting, they are very sensitive to shock and impact. Any rough handling prior to and during charging may result in breakage or weakening of the pellets, causing them to disintegrate to a fine size during passes through the gas-solid reaction zone and to be discarded through the screening apparatus with the excess reductant material and sulphur-absorbent material. Any such disintegration can be minimized by limiting the maximum pellet drop at transfer points, during conveying and feeding of the reactor, preferably to a maximum of about 6 inches, and certainly less than 12 inches.

Gentle feeding of charge material, including pellets, is obtained by means of the rotary feed pipe 64. The feed pipe is secured within a slidable, releasable bearing sleeve 65, in turn supported by, and adapted to be rotated within, the rollers 66. In the embodiment illustrated, the rollers are confined by bearing housing 69 according to known roller bearing practice, to substantially prevent radial and axial movement of the feed pipe during operation. The bearing housing is mounted on frame 67 attached to the reactor head. The feed pipe 64 is rotated, preferably at an adjustable and variable speed, by drive motor assembly 70, connected to gear and pinion 73 or other suitable driving linkage. The feed pipe opening through the reactor head can be sealed by a gas or air curtain sealing arrangement 71, similar to the sealing assembly 56, 57, 58 and 72, as used to seal the reactor air supply pipe opening. The feed pipe 64 is supplied with charge materials by means of a tapered chute (not illustrated) inclined at an angle somewhat greater than the friction angle or angle of repose of the material. In order to avoid any unbalancing of the reactor head assembly, with resulting unequal pressures around the circumference of the sealing faces 42 and 43, the centre of gravity of the above described apparatus is preferably located in line, vertically, with the longitudinal axis of the reactor.

An essential feature of this feeding apparatus is a close, limiting control over the speed of moving the charge mixture along the pipe, thus preventing any sudden impact due to high velocity at the discharge point 74. The angle of the feeding pipe 64 to the horizontal should not exceed either the angle of repose of the material or the friction-angle of the pipe with the material, and would be less than 30° to the horizontal. The feeding speed can then be controlled within a wide range by varying the rotational speed of the pipe. A close, limiting control of distance dropped after discharge is obtained by properly locating the pipe discharge end 74. Referring to FIGURE 8, by locating the discharge point 74 close to the inner wall on the opposite side of the reactor to the side containing most of the charge material 125, the maximum drop can be controlled by limiting the distance from the discharge point to the wall, allowing the charge material to fall only a short distance, the descending charge material striking the descending reactor wall at an oblique angle, in this way avoiding any sudden impact of the pellets. The closest point along the inner circumference of the feed pipe at its discharge end preferably should be less than one foot from the reactor wall, thus avoiding any large drops. An additional decrease in dorpping distance can be obtained by rotating the pipe in the opposite direction to the reactor, as indicated by the arrows 76 and 94 respecively, thereby discharging the material mainly from the quadrant of the pipe in closest proximity to the reactor wall. By using the above apparatus, the distance dropped is controllable and independent of the degree of filling of the reactor with charge material; any danger of obstructing the feed pipe with charge material is avoided; and the pipe can be cleaned, removed or replaced easily during operation.

FIGURE 9 illustrates suitable charging equipment 11, of FIGURE 2, for additional reductant and sulphur-absorbent material required in the gas-solid reaction zone, and charging equipment 16 for alloying and fluxing materials required in the gas-liquid reaction zone. Feed materials can be introduced into external scoop and hopper 75 by scooping from a pile or hopper beneath the reactor, or fed by gravity from an external hopper, according to known means for feeding rotary kilns. As the hopper approaches the uppermost position of its travel, the sealing gate 77 is opened inwards by a connecting lever 79 and roller 80, which is forced into the open position, close to the reactor shell, by contacting the fixed cammed surface 81, allowing the material to flow by gravity through internal feed pipe 82, into the reactor. During the balance, or major portion of reactor rotation, the sealing gate is held in the closed position by spring-loaded hinge 78, preventing the free interchange of gases between the reactor interior and the surrounding air. The internal feed pipe 82 preferably extends nearly to the central axis of the reactor to prevent its being covered by the bed of charge material during any portion of the reactor rotation.

Before passage of the charge mixture from the gas-solid reaction zone, the excess reductant material and sulphur-absorbent material are removed by means of the screening apparatus 13, illustrated in some detail in FIGURES 5 and 6. At this section, the circumference of the reactor is comprised of a plurality of screen support segments 83, which can be attached by bolts or other means of releasable fasteners to the shell flanges 84 of the reactor. The segments are enclosed on both ends by the radial end plates 85, which are to prevent the free passage of gas circumferentially between the enclosed cavities 90 of the screen support segments 83 and impart to the reactor the necessary structural rigidity in the screen section between shell flanges 84. The screen deck segments 86, through which the fine-sized materials inside the reactor are discharged, are mounted on the screen support flanges 87 along the inner radius of the screen support segments 83, and attached by releasable fasteners. Along the outer radius are mounted removable cover plates 88, and discharge doors 89 which, in the closed position, prevent the free flow of gases between the interior cavity 90 of the support segment, and the exterior surroundings of the reactor. The discharge doors 89 are held in the closed position by the spring-loaded hinges 91, an extension of the rotatable part of which is attached to connecting levers 92 and rollers 93.

As the reactor is rotated in the direction of the arrow 94, the screen deck segments 86 pass under and in contact with the bed of charge material contained, for example, up to the level of dotted line 95. Material finer than the screen openings is allowed to pass into the interior cavity 90 of the screen support segment 83. After an entire screen deck segment 86 is in contact with, and covered on the inner surface by charge material, the discharge door 89 is forced to the open position by the action of roller 93 contacting the adjustable, possibly spring-mounted cammed surface 96, allowing the fine material to discharge through the door opening into, for example, a tank of cooling water. While the leading end 97 of the screen deck segment 86 is still covered with charge material the door is released and allowed to close by action of the spring-loaded hinge 91. Thus, by allowing the bed of charge material to prevent the free flow of gases between the reactor and surrounding atmosphere during that part of a revolution when fine-sized materials are being discharged, any danger of combustible gas loss, reoxidation of metallic iron to iron oxide or poor reactor atmosphere control is minimized.

The screen deck segments 86 generally consist of a fine wire supported from beneath by stringers of heavier section, or perforated plate, smooth on the inner surface, having openings with sharp acute-angled edges, to minimize plugging or blinding of the screen openings. Mechanical screen cleaning apparatus, such as electro-magnetically or pneumatically operated screen vibrators attached to the deck segments, or high-velocity jets of gas directed to impinge at intervals upon the outer deck surface, can also be employed if necessary. The entire assembly is preferably constructed of a heat-resistant metal alloy, for example, stainless steel type 310, in order to withstand high temperatures.

After the fine-sized materials have been discharged from the reactor, the remaining solid charge materials, consisting of pellets and usually alloying and fluxing materials, pass over the top edge 98 of dam 18 on the discharge side of which is the gas-solid-liquid reaction zone containing partly solid and partly liquid charge mixture. In order to avoid any softening and sticking of the pellets during passage over the top edge 98 of the dam 18, the top edge 98 is narrow, thus providing a short transfer period of the retained material.

In order to avoid any area within the reactor in which the charge is melted only to a sticky condition, agglomerating and sticking to the walls, the angle of incline of the reactor, height of the discharge opening 19 above the reactor bottom and distance between the dam 18 and the discharge opening 19 is preferably arranged to maintain an appreciable depth of liquid metal against the discharge side 99 of the dam 18. By this means, melting solid materials are immersed in a lubricating pool of liquid metal, thus preventing any tendency of adherence to the reactor walls by replenishing their coating of liquid metal and slag as the solid-liquid mixture is agitated by the rotary wall movement.

In order to provide the required heat for melting, and to control the gas atmosphere in the vicinity of the transition from the gas-solid to gas-solid-liquid reaction zone, a specially-designed burner 17 is provided. The burner can be a similar type to the other shell-mounted burners but, in addition, is provided with an additional fuel inlet, or inlets, for the introduction of excess fuel beyond that required for heating, to create a non-oxidizing atmosphere in the vicinity of the screen section and to cool, if necessary, the hot gas passing from the gas-solid-liquid into the gas-solid reaction zone. FIGURES 5 and 6 illustrate a simple example of such a burner 17, mounted at the location of the screen section and partly directed into the gas-solid-liquid reaction zone to provide additional heat for melting. The outer burner chamber 33 is attached, by means of adapter plate 105, to the outer circumference of one of the screen support segments 83. The cavity 106 between the inner surface of the screen support segments and the outer burner pipe is preferably filled with a refractory material. Additional fuel is supplied through the valved supply line 100, conducted through the internal burner pipe 101, and directed by means of nozzle 102 against a circular deflection plate 103 having a flat or dished surface secured to the burner with connecting rods 104. The fuel is deflected in an approximately radial direction, almost uniformly distributed around the circumference of the reactor, intercepting and reacting with the gases emitted from the gas-solid-liquid reaction zone into the gas-solid reaction zone. By this means the nearly neutral, or weakly reducing, and very hot gases from the gas-solid-liquid reaction zone can be reacted to form the more strongly reducing, and cooler gases required in the gas-solid reaction zone.

In addition to the heat supplied into the gas-solid-liquid reaction zone by the burner 17 to assist in melting, the main source of heat in the gas-liquid and gas-solid-liquid reaction zone is the burner 22 (FIGURE 2) located at the discharge end of the reactor and directed into the reactor through the main metal discharge opening and across the top of the slag surface. This burner is illustrated in the discharge end assembly shown in FIGURES 10 and 11. Preheated or oxygen-enriched air and fuel are supplied to the outer burner chamber 111 by the flexible air supply pipe 110 and fuel supply pipe 115. Fuel and air are kept separated nearly to the burner tip, where mixing and combustion occur in an elongated flame zone 116 in front of the burner nozzle.

As the liquid metal and slag are formed and advance through the gas-liquid reaction zone, the rotating refractory walls effect a continual mixing action, thereby increasing the rates of heat transfer into the metal from the hot gaseous products of combustion, increasing the rates of chemical reaction between metal and slag, and minimizing segregation of constituents contained within the metal and slag bath. In such a furnace which discharges liquid by overflowing through a restricted opening, it will be appreciated that the slag would tend to pass more quickly through the gas-liquid reaction zone than the metal, which could result in an insufficient slag depth for proper refining reactions. If, for example, the slag level 107 and the metal level 108 are as shown in FIGURE 10, the rate of flow of slag into the discharge opening 19, and hence the quantity of slag in the discharging liquid stream 109, can be controlled by means of the adjustably-positioned slag dam 119, restricting the size of the flow-control gap 120. By this means, any waste of fluxing materials can also be avoided by increasing the average retention time of slag constituents within the gas-liquid reaction zone.

The slag dam 119 may consist either of refractory or a water-cooled shell of heat-resisting material, and be adjustable by moving the entire burner assembly. To accomplish this movement, the burner is mounted on carriage 139 having wheels 141 running on tracks 138. Adjustment of burner position in the axial direction is effected by adjusting the distance between roller 142 and carriage 139 by movement of bearing shoes 143 on track 144, and in the vertical direction by controlled rotation about the pivot bearing 128, these movements being effected by hydraulic cylinders 140 or a mechanical equivalent. Contact between roller 142 and the reactor may be maintained by means of counterweights attached by cable to the carriage assembly through pulleys. This arrangement also provides easy removal of the burner from the reactor for repair or to provide access to the reactor interior.

In order to prevent the free transfer of gases through the restricted opening 19, a sealing curtain of air or gas, similar in principle to assembly 56, 57, 58 and 72 can be used. The annular header pipe 122, supplied by a gas or air under pressure from supply pipe 126, is attached to the outer container of the water jacket by an annular connecting barrier. Since the gas-liquid reaction zone is normally operated at a slight negative pressure relative to atmospheric pressure, the annular slit 121 is shown to be directed at an acute angle towards the inner walls of the discharge opening, impinging in a direction in opposition to the anticipated flow of the atmosphere into the reactor.

Heat may be applied to the inner walls of the discharge opening 19, if necessary to prevent any tendency of slag or metal to solidify and adhere to the refractory, by directing burners to impinge on the inner surface of the discharge opening. The method is employed most effectively when the burners are positioned to apply heat to a segment of the discharge opening 19 adjacent to the discharging metal stream, heating the surface of the refractory just prior to its contact with the liquid metal. Alternatively, the surface of the discharge opening may be heated by electric resistance elements embedded in the refractory. Tungsten, molybdenum or silicon carbide are examples of materials suitable for heating elements, and high-purity magnesia or alumina for the refractory lip material which encases the elements. Electrical energy can be supplied to the elements in known manner by means of stationary brushes in contact with collector rings attached to, and rotating with, the reactor shell.

It may also be desirable to inject finely-divided alloying and fluxing materials, such as carbon, aluminum, calcium carbide, and ferrosilicon, either onto the top of the slag or injected into the metal bath to adjust the liquid metal composition. One or more injection lances 124, of known manner of construction and usually water-cooled, can be provided for this purpose. The material to be injected would be entrained and injected under pressure using known means through the injection lance 124 to lance nozzle 125, which can be directed to either discharge onto the slag, or extend downward through the slag into the bath. Additions by injection can also be made to the liquid metal after discharge and prior to casting.

A suitable internal burner construction is shown in FIGURE 11, which is a transverse sectional view of the burner 22 through the axis of slag dam 119. Fluid fuel is supplied to the burner tip through inner fuel pipe 112 and oxygen-containing gas along air annulus 113 confined by air pipe 114. For use with hot air, an insulating annular space 117 is provided to minimize heat loss to the burner cooling water circulated in water annulus 118. In the embodiment shown, incoming water is conducted to the burner nozzle end by four water circulation pipes 123 and returned by way of cooling water annulus 118. The slag dam 119 is attached to the outer burner pipe by slag dam support brackets 129 and is cooled by water supplied through water pipe 132 (FIGURE 10) to water inlet 137 and circulated around dam water jacket 131 to water outlet 136. The opening 130 between the dam and burner provides a convenient opening for insertion of injection lance 124, also cooled by water confined in the annulus between outer jacket 133 and inner injection pipe 134, the cooling water being conducted to the lance tip through circulation pipe 135.

The liquid metal and slag may be discharged together by overflowing through discharge opening 119 and separated after discharge by a slag separation device 20 (FIGURE 2), which may also be heated and of which there are a number of known variations. Alternatively, the metal may be syphoned from the reactor by way of a refractory tube inserted into the metal bath by way of opening 130. In this event, it may be desirable to discharge the slag intermittently, rather than continuously. The metal would be discharged by suction into a closed vessel under controlled negative pressure, or syphoned into a receptacle containing metal at a level lower than bath level 108. Metal and slag may also be discharged by way of tapping holes extending through the reactor shell, such as indicated by tap hole 21 of FIGURE 2. Holding furnaces, for example, electric induction-type furnaces, may also be used for accumulation and adjustment of metal composition prior to casting.

It should be understood that only a preferred type of apparatus for conducting the process has been described. The process could possibly be conducted in alternative types of apparatus, for example, the section of the reactor containing the gas-liquid reaction zone could be comprised of a separate, independently driven unit, the size separation of material being performed by a suitably arranged conventional screening equipment, for example, a flat, inclined vibrating or oscillating screen. Advantages of such an arrangement are independent shutdown of the second section for repair or other reasons and independently variable rotational speed, which could possibly improve mixing or heat transfer.

Such an arrangement, however, is difficult to implement in practice because a number of operations must be conducted simultaneously during transfer of material from the first to the second reactor section. The operations include the separation of coarse from fine material, retaining the coarse material under protective atmosphere and rejecting the fine material into a cooler or quench tank, transferring of the coarse material as feed into the second section under a protective atmosphere whilst maintaining communication for flow of hot gases between the gas-solid-liquid reaction zone and the gas-solid reaction zone, maintaining seals to prevent excessive air inflow with resulting loss of atmosphere control, and also supplying heat for melting into the second section near its feed end.

The above operations are complicated by relative movement between the two rotary drums during operation. This movement results from axial expansion and contraction upon heating and cooling of the reactor shell, and axial and radial movement of the reactor bodies as occurs when the drums are rotated on their supporting trunnions. Additional reactor drive and screen drive assemblies, an additional fuel and air supply, additional sliding seals and chutes capable of operating at high temperatures are also required. It is probable, therefore, that the advantages obtained by providing an independently-driven second section would not justify the additional expense and mechanical complications involved.

In summary, it would appear that other forms of apparatus could be used to conduct the process, but a single, rotary-drum unit, embodying the features which have been described, affords the advantages of simplicity, heat economy, control of gas composition, temperature and chemical reactions along the entire processing operation. It will also be appreciated that other variations and modifications to the process may be made by persons skilled in the art, without departing from the scope of the invention defined in the appended claims.

What I claim is:

1. A process for the production of liquid ferrous metals of controlled composition directly from iron ore or iron ore concentrates conducted within successive reaction zones namely a gas-solid, a gas-solid-liquid and a gas-liquid reaction zone, comprising the steps of: (a) introducing into the gas-solid reaction zone a charge mixture including pellets containing iron oxide and solid pieces of reductant material, the lower limit of the size of said pellets and the upper limit of the size of said reductant material being selected with respect to each other so that the reductant material may be size-separated from said pellets following heating and reaction of the charge mixture within said gas-solid reaction zone; (b) advancing said charge mixture through the gas-solid reaction zone for reaction at an elevated temperature until a major portion of the iron contained in the pellets has been reduced to metallic state; (c) making a size separation of coarse-sized materials comprising pellets from fine-sized materials including the unconsumed reductant material along with any fine-sized pellet fragments obtained from disintegration of the pellets and removing from the gas-solid reaction zone the fine-sized materials to a location external from the process whilst retaining the coarse-sized materials within said gas-solid reaction zone at elevated temperature; (d) introducing the hot retained charge mixture of coarse-sized materials including pellets into the gas-solid-liquid reaction zone; (e) continually advancing the charge and increasing the temperature within said gas-solid-liquid reaction zone until the coarse-sized materials are melted into a liquid state whereby two liquid phases are formed consisting of slag and metal in close contact; (f) advancing said two liquid phases into the gas-liquid reaction zone; (g) continually carrying on the refining reactions and heating in the gas-liquid reaction zone until liquid ferrous metal is obtained having a desired composition and temperature; (h) discharging the liquid ferrous metal and slag from the gas-liquid reaction zone; and (i) supplying heat into the gas-liquid, gas-solid-liquid and gas-solid reaction zones as required to maintain the desired reaction temperatures in the zones.

2. A process according to claim 1, in which sulphur-absorbent material is added to the charge materials introduced into said gas-solid reaction zone in step (a), and unconsumed sulphur-absorbent material is removed with the unconsumed reductant material in step (c).

3. A process according to claim 1, in which fluxing materials and alloying materials are added to the charge mixture introduced into the gas-solid reaction zone in step (a) contained in the form of pieces which are larger than said lower limit of the size of pellets.

4. A process according to claim 1, in which said pellets are formed by the agglomeration of finely-divided materials, including particles of iron ore material, into the desired size of pellet.

5. A process according to claim 4, which includes the additional step of recirculating particles obtained by comminution of said fine-sized pellet fragments removed from the gas-solid reaction zone, by introducing controlled quantities of said pellet fragment particles into said finely-divided materials before agglomeration of said materials into pellets.

6. A process according to claim 1, which includes the additional step of recirculating a major part of the unconsumed reductant material removed from the gas-solid reaction zone in step (c) back into the charge mixture contained within the gas-solid reaction zone.

7. A process according to claim 1, in which hot gases flow in contact with the charge mixture and flow counter-current to the general movement of the charge mixture through the reaction zones, the hot gases flowing in sequence through the gas-liquid reaction zone, into and through the gas-solid-liquid reaction zone, and into and along the gas-solid reaction zone from which latter zone the gases are then expelled.

8. A process according to claim 1, in which said reaction of the charge mixture in the gas-solid reaction zone in step (b) is continued until at least 95 percent, by weight, of the iron contained in the pellets of the charge mixture is in metallic state before the charge mixture is advanced to step (c).

9. A process according to claim 1, which includes the additional step of controlling the rate of slag discharge by means of an adjustable restriction of the flow of slag from the gas-liquid reaction zone.

10. A process according to claim 1 including the step of effecting a restriction of the opening at the charge end of the gas-solid-liquid reaction zone and a restriction of the opening at the discharge end of the gas-liquid reaction zone whereby said restrictions confine and maintain a continuous elongated pool of metal along the length of said gas-solid-liquid and gas-liquid reaction zones, said liquid metal pool having a maximum depth governed by the amount of said restriction of the opening at the discharge end of the gas-liquid reaction zone.

11. A process according to claim 10, wherein said gas-solid-liquid and gas-liquid reaction zones are elongated and cylindrical and said restrictions are each annular and co-axial, including the step of rotating said zones to effect continual agitation and successive advancement of the charge mixture along the length of said zones.

12. A process according to claim 1 in which said heat is supplied by combusting controlled quantities of fuel and oxygen-containing gas introduced directly into each of gas-liquid reaction zone at the discharge end, directly into the gas-solid-liquid reaction zone, and directly into the gas-solid reaction zone, and the hot combustion products flow countercurrent to the general movement of charge mixture, the gases flowing from the gas-liquid reaction zone, through the gas-solid-liquid and gas-solid reaction zones in sequence.

13. A process for the production of liquid ferrous metals of controlled composition directly from iron ore or iron ore concentrates conducted within successive reaction zones, namely a gas-solid, a gas-solid-liquid and gas-liquid reaction zone, comprising the steps of: (a) introducing into the gas-solid reaction zone a charge mixture including pellets containing iron oxide and solid pieces of reductant material and sulphur-absorbent material, the lower limit of the size of said pellets and the upper limit of the size of said reductant material and sulphur-absorbent material being selected with respect to each other so that the reductant material may be size-separated from said pellets following heating and reaction of the charge mixture within said gas-solid reaction zone; (b) advancing said charge mixture through the gas-solid reaction zone for reaction at an elevated temperature until a major portion of the iron contained in the pellets has been reduced to metallic state; (c) adding fluxing materials and alloying materials into the gas-solid reaction zone contained in the form of pieces which are larger than said lower limit of the size of the pellets; (d) making a size separation of coarse-sized materials comprising pellets from fine-sized materials including the unconsumed reductant material along with any fine-sized pellet fragments obtained from disintegration of the pellets and removing from the gas-solid reaction zone the fine-sized materials to a location external from the process whilst retaining the coarse-sized materials within said gas-solid reaction zone at elevated tempearture; (e) introducing the hot retained charge mixture of coarse-sized materials, including pellets into the gas-solid-liquid reaction zone; (f) increasing the temperature and advancing the charge along said gas-solid-liquid reaction zone until the coarse sized materials are melted into a liquid state whereby two liquid phases are formed consisting of slag and metal in close contact; (g) introducing said two liquid phases into the gas-liquid reaction zone; (h) carrying on the refining reactions and heating in the gas-liquid reaction zone until liquid ferrous metal is obtained having a desired composition and temperature; (i) discharging the liquid ferrous metal and slag from the gas-liquid reaction zone; (j) supplying heat directly into each of the gas-liquid, gas-solid-liquid and gas-solid reaction zones as required to maintain the desired reaction temperatures in the zones; (k) effecting counter-current flow of hot gases in contact with the charge mixture counter-current to the general movement of the charge mixture through the reaction zones, the hot gases flowing in sequence through the gas-liquid reaction zone, into and through the gas-solid-liquid reaction zone and into and along the gas-solid reaction zone from which latter zone the gases are then expelled; and (l) effecting continuous mixing, agitating and advancing action of the charge mixture in a manner to provide continual relative movement between the pellets and the pieces of reductant material and sulphur-absorbent material in the gas-solid reaction zone, and continual mixing of partly melted pellets and pieces of fluxing materials and alloying materials in the gas-solid-liquid reaction zone, and continual agitation of liquid ferrous metal and slag in the gas-liquid reaction zone.

14. A process for the production of liquid ferrous metals of controlled composition directly from iron ore or iron ore concentrates in which the following steps are conducted continuously and simultaneously within elongated, continuous reaction zones: (a) reacting at elevated temperature in a gas-solid reaction zone a charge mixture including pellets containing iron oxide and solid pieces of reductant material, the lower limit of the size of said pellets and the upper limit of the size of said reductant material being selected with respect to each other so that the reductant material may be size-separated from said pellets following heating and reaction of the charge mixture within the said gas-solid reaction zone; (b) making a size separation of coarse-sized materials comprising pellets from fine-sized materials including the unconsumed reductant materials along with any fine-sized pellet fragments obtained from disintegration of the pellets and removing from the gas-solid reaction zone the fine-sized materials to a location external of the process whilst retaining the coarse-sized materials within said gas-solid reaction zone at elevated temperature; (c) melting the retained charge mixture of coarse-sized materials, including pellets, within a gas-solid-liquid reaction zone to form two liquid phases consisting of metal and slag in close contact; (d) refining of liquid metal and slag phases within a gas-liquid reaction zone to obtain liquid ferrous metal having a desired composition and temperature; and (e) supplying heat directly into each of the gas-liquid, gas-solid-liquid and gas-solid reaction zones, as required to maintain the desired reaction temperatures in the zones.

15. A process for the production of liquid ferrous metals of controlled composition directly from iron ore or iron ore concentrates which is conducted within successive, elongated, rotary reaction zones, namely, a gas-solid reaction zone, a gas-solid-liquid reaction zone, and a gas-liquid reaction zone, comprising the steps of:
  (a) introducing into the gas-solid reaction zone a charge mixture including pellets containing iron-oxide and solid pieces of reductant material, the lower limit of the size of the said pellets and the upper limit of size of said reductant material being selected with respect to each other so that the reductant material may be size separated from said pellets following heating and reaction of the charge mixture within said gas-solid reaction zone;
  (b) advancing said charge mixture through the gas-solid reaction zone for reaction of an elevated temperature until a major portion of the iron contained in the pellets has been reduced to metallic state;
  (c) making a size separation of coarse-sized materials comprising pellets from fine-sized materials including the unconsumed reductant materials along with any fine-sized pellet fragments obtained from disintegration of the pellets and removing from the gas-solid reaction zone the fine-sized materials to a location external from the process whilst retaining the coarse-sized materials within said gas-solid reaction zone at elevated temperature;
  (d) effecting an annular restriction at the discharge end of said gas-liquid reaction zone and annular restriction between said gas-solid-liquid and gas-solid reaction zones whereby said restrictions are adapted for confining the charge to form and maintain a level pool of liquid metal with slag layer on the surface of said pool of metal substantially along the length of said gas-solid-liquid and gas-liquid reaction zones;

(e) introducing the hot retained charge mixture of coarse-sized materials including pellets into the gas-solid-liquid reaction zone;

(f) increasing the temperature and advancing the charge along said gas-solid-liquid reaction zone until the coarse-sized materials are melted into a liquid state whereby two liquid phases are formed consisting of slag and metal in close contact;

(g) introducing said two liquid phases into the gas-liquid reaction zone;

(h) carrying on the refining reaction and heating in the gas-liquid reaction zone and advancing the charge until liquid ferrous metal is obtained having a desired composition and temperature;

(i) supplying heat by combusting fuel and oxygen-containing gas introduced along the gas-liquid, gas-solid-liquid, and gas-solid reaction zones as required to maintain the desired reaction temperatures in the zones;

(j) effecting flow of hot gases in contact with the charge mixture countercurrent to the general movement of the charge mixture through the reaction zones, the hot gases flowing in sequence through the gas-liquid reaction zone into and through the gas-solid-liquid reaction zone into and along the gas-solid reaction zone from which latter zone the gases are expelled;

(k) rotating the walls confining said rotary reaction zones to effect continual agitation and successive advancement of the charge mixture and facilitate chemical reactions and heat transfer; and (l) discharging the liquid ferrous metal and slag from the gas-liquid reaction zone.

16. The process according to claim 15 in which said rotary gas-solid, gas-solid-liquid and gas-liquid reaction zones are co-axially aligned.

17. A process according to claim 15 in which said fuel and oxygen-containing gas for supplying heat is introduced directly into the gas-liquid reaction zone at the discharge end, directly into the gas-solid-liquid reaction zone, and at intervals along the gas-solid reaction zone.

References Cited

UNITED STATES PATENTS

| | | | |
|---|---|---|---|
| 1,971,041 | 8/1934 | Kalling et al. | 75—39 |
| 2,526,658 | 10/1950 | Harman et al. | 75—38 |
| 2,526,659 | 10/1950 | Harman et al. | 75—38 |
| 2,754,197 | 7/1956 | Wienert | 75—36 |
| 2,807,536 | 9/1957 | O'Malley | 75—38 |
| 2,941,791 | 6/1960 | Wienert | 75—36 X |
| 3,126,277 | 3/1964 | Smith | 75—36 |
| 3,165,398 | 1/1965 | Shimamura et al. | 75—40 |
| 3,180,725 | 4/1965 | Meyer et al. | 75—36 X |
| 3,235,375 | 2/1966 | Meyer et al. | 75—34 |
| 2,287,663 | 6/1942 | Brassert | 75—39 X |
| 2,356,524 | 8/1944 | Lohse | 75—40 |
| 2,747,988 | 5/1956 | Von Haken | 75—38 X |

HENRY W. TARRING II, Primary Examiner

U.S. Cl. X.R.

75—40, 43, 36